United States Patent
Roark et al.

[11] Patent Number: 5,961,138
[45] Date of Patent: Oct. 5, 1999

[54] MOTORCYCLE FOOTBOARD TRIM PIECE

[75] Inventors: Michael A. Roark, West Allis; Michael J. DeCaluwe, West Bend, both of Wis.

[73] Assignee: Harley-Davidson Motor Company, Milwaukee, Wis.

[21] Appl. No.: 09/013,432

[22] Filed: Jan. 26, 1998

[51] Int. Cl.$^6$ ................................................ B62J 25/00
[52] U.S. Cl. ........................................ 280/291; D12/114
[58] Field of Search .................................. 280/163, 169, 280/291, 164.1; 180/219; D12/107, 110, 114

[56] References Cited

U.S. PATENT DOCUMENTS

| | | | |
|---|---|---|---|
| 4,174,852 | 11/1979 | Panzica et al. | 280/291 |
| 5,738,180 | 4/1998 | Hofmann et al. | 280/291 |

OTHER PUBLICATIONS

Retro Rocket Designs direct mail advertisement received prior to Jan. 26, 1997.

*Primary Examiner*—Kevin Hurley
*Assistant Examiner*—William R. Zimmerli
*Attorney, Agent, or Firm*—Michael Best & Friedrich LLP

[57] ABSTRACT

A motorcycle footboard assembly with a decorative element. The footboard assembly includes a pad adapted for placement of a motorcycle operator's foot, a platform spaced from the pad and adapted to be mounted to a motorcycle, and at least one vibration-dampening mount that interconnects the footboard to the platform. The decorative element has at least one aperture that engages the mount. The decorative element includes a substantially rigid mounting plate that is configured to engage the footboard assembly and a trim piece that is mounted to the mounting plate. The trim piece can be a flexible panel such as a sheet of leather fringe.

20 Claims, 2 Drawing Sheets

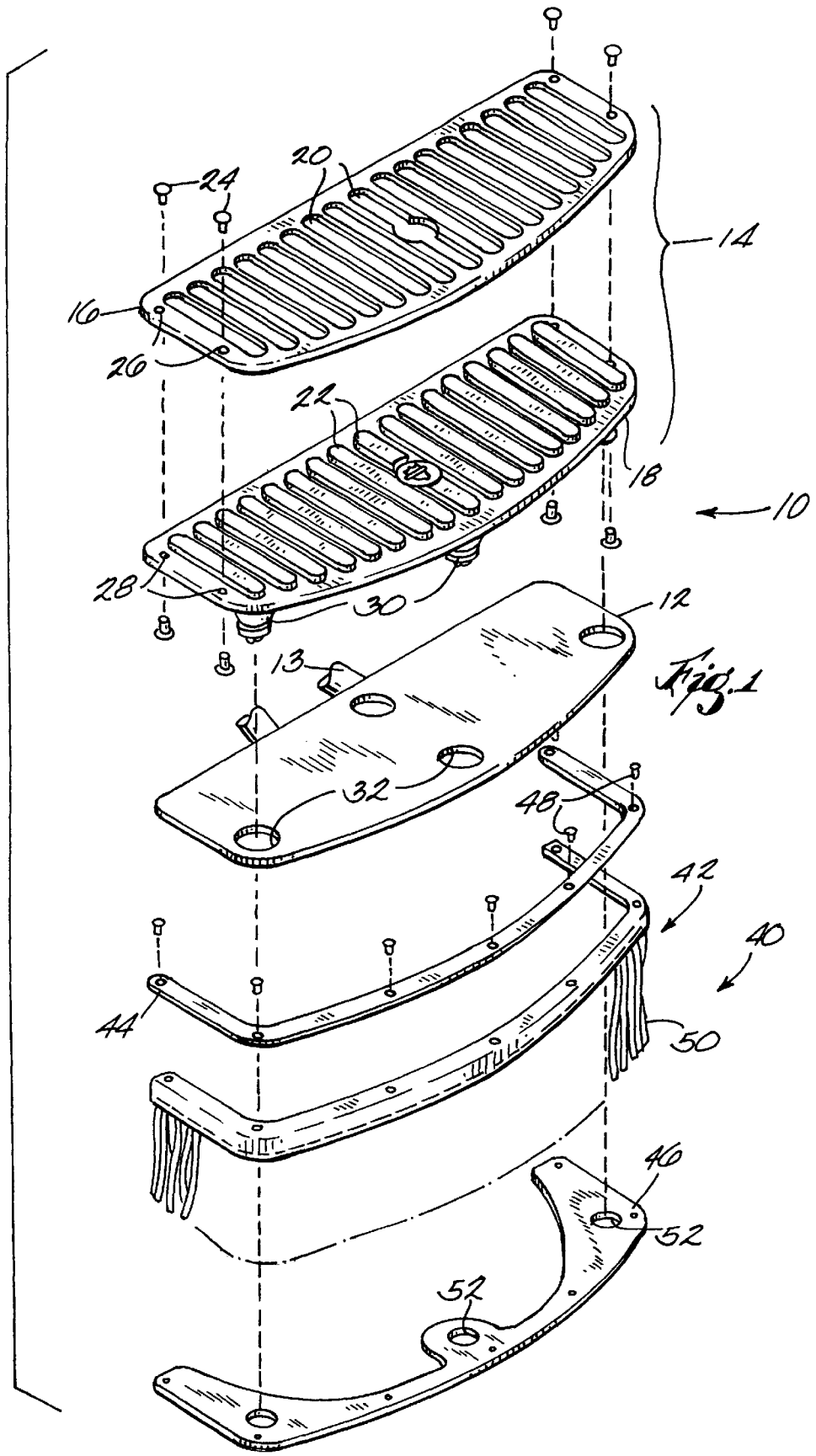

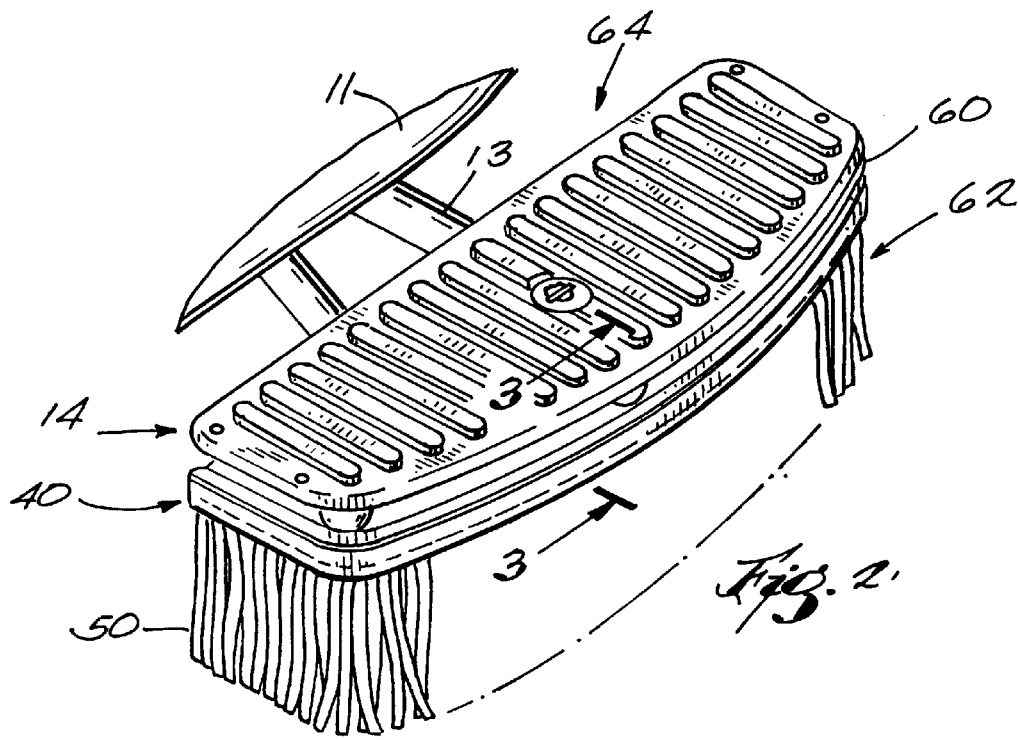
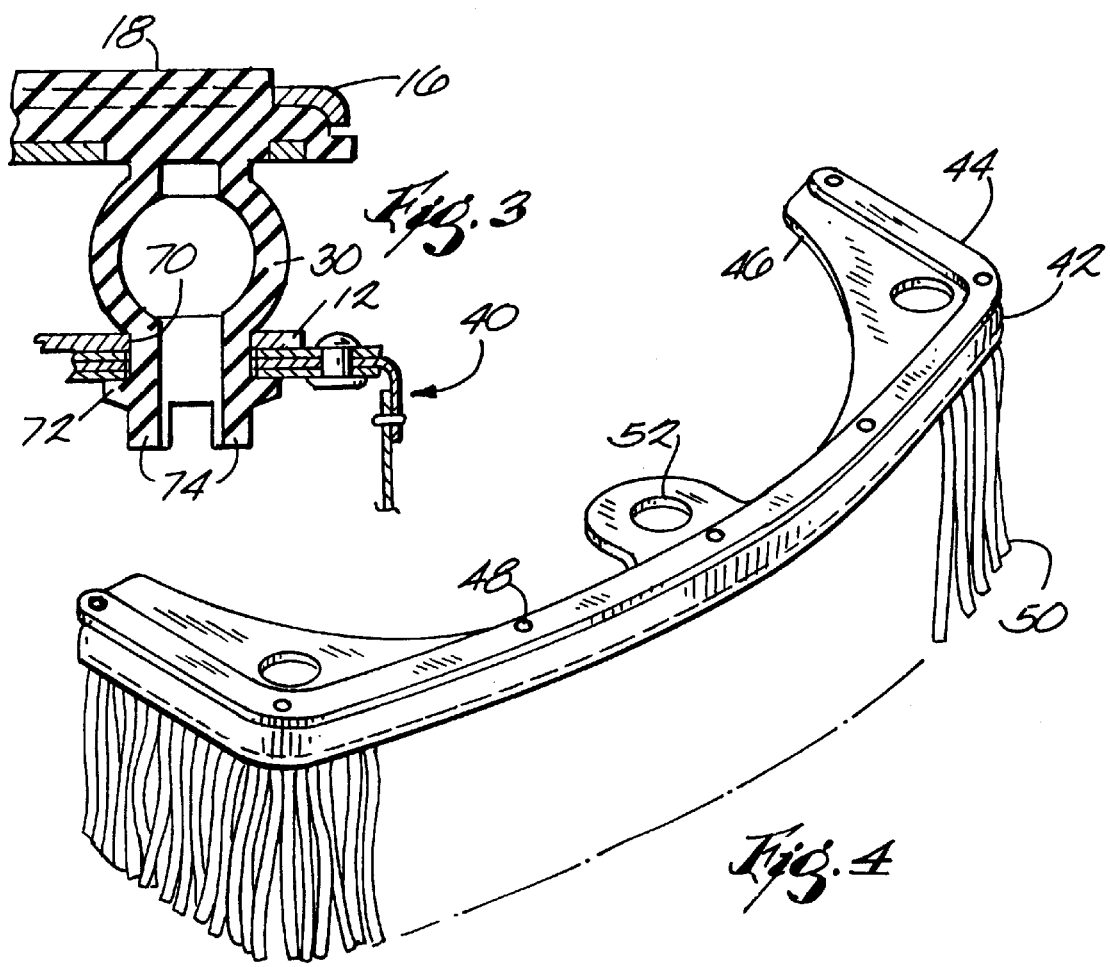

MOTORCYCLE FOOTBOARD TRIM PIECE

FIELD OF THE INVENTION

The present invention relates generally to the field of decorative elements that are mounted to a motorcycle, and more particularly to decorative elements that are mounted to a motorcycle footboard.

BACKGROUND OF THE INVENTION

Footboards on motorcycles provide a place for operators and passengers to place their feet when riding the motorcycle. Typically, the operator footboards are located adjacent to a brake pedal and shift levers so that the operator can perform the necessary braking and shifting functions for operating the motorcycle. Passenger footboards are often designed to be pivotable from a horizontal operative position to a vertical inoperative position so that the passenger footboards can be pivoted out of the way when not being utilized.

Both operator and passenger footboards typically comprise a resilient pad mounted to a rigid platform. The resilient pad can comprise a resilient material, such as rubber, and the rigid platform typically comprises metal, such as aluminum or steel. The resilient pad provides a high-friction surface to improve frictional contact between the footboard and the operator's foot, and further assists in dampening vibration traveling from the motorcycle to the operator's or passenger's feet. To further improve vibration dampening, some footboards utilize vibration-dampening mounts (e.g., spherical rubber members) positioned between the resilient pad and the rigid platform. Such vibration-dampening mounts are commonly called shaker mounts.

With motorcycles of this type, it is highly desirable to customize the motorcycle to reflect the individual owner's taste and personality. Custom accessories often include chrome or leather accents to draw attention to aspects of the motorcycle or to give a more traditional appearance. Such chrome or leather accents should preferably be simple and convenient to mount to the motorcycle.

SUMMARY OF THE INVENTION

The present invention provides a footboard assembly with a decorative element, comprising a footboard assembly including a pad adapted for placement of a motorcycle operator's foot, a platform spaced from the pad and adapted to be mounted to a motorcycle, at least one vibration-dampening mount that interconnects the pad to the platform. The decorative element includes at least one aperture (e.g., a closed aperture) that engages the mount. By mounting the decorative element to a mount of the footboard assembly, the decorative element may be simply and conveniently mounted to the motorcycle. Further, accenting the footboard of the motorcycle, for example with a hanging leather fringe, gives the footboard a traditional and aesthetically pleasing appearance.

The decorative element may comprise a trim piece that extends around a portion of the outer perimeter of the footboard assembly, or more specifically on the outward facing side of the footboard assembly. The trim piece may include a flexible panel and/or a plurality of flexible string elements that depend from the footboard assembly. To give the decorative element a traditional appearance, the plurality of flexible string elements may comprise leather strips.

The decorative element may also comprise a mounting plate (e.g., a rigid metal plate). The trim piece may then be mounted to the mounting plate. More particularly, if the mounting plate comprises a top plate and a bottom plate, a portion of the trim piece may be sandwiched between the top plate and the bottom plate. Preferably, the aperture is in the mounting plate. The mounting plate provides a robust connection to the footboard assembly.

BRIEF DESCRIPTION OF THE DRAWINGS

FIG. 1 is an exploded assembly view of a footboard assembly with a decorative element embodying the present invention.

FIG. 2 is a perspective view of the footboard assembly with a decorative element, as assembled and mounted to a motorcycle.

FIG. 3 is a side cross-sectional view of the footboard assembly with a decorative element taken through section 3—3.

FIG. 4 is a perspective view of the decorative element.

Before one embodiment of the invention is explained in detail, it is to be understood that the invention is not limited in its application to the details of the construction and the arrangements of processes set forth in the following description or illustrated in the drawings. The invention is capable of other embodiments and of being practiced or being carried out in various ways. Also, it is understood that the phraseology and terminology used herein is for the purpose of describing the illustrated embodiment and should not be regarded as limiting the scope of the invention.

DETAILED DESCRIPTION OF THE PREFERRED EMBODIMENT

FIGS. 1–3 illustrate a footboard assembly 10 with a decorative element 40 embodying the present invention. In the illustrated embodiment, the footboard assembly is identical to the footboard assembly disclosed in U.S. patent application Ser. No. 08/699,013, which is incorporated by reference in its entirety. Such a footboard assembly is commonly used on HARLEY-DAVIDSON® motorcycles. Other motorcycles may incorporate vibration absorption systems into the footboard assembly in a variety of configurations. The invention may be applicable to any suitable footboard assembly. As shown in FIG. 1, the illustrated footboard assembly 10 includes a rigid platform 12 that is adapted to be mounted to the motorcycle 11 (FIG. 2) and a resilient pad 14 that is spaced from and attached to the platform 12. The platform is connected to the motorcycle 11 by bars 13. The illustrated pad 14 includes a cover 16 that is preferably made of rigid, chromed metal such as aluminum or steel. The cover 16 is attached to a resilient member 18 that is made of a resilient material such as rubber. The cover includes a plurality of slots 20 through which ribs 22 of the resilient member 18 extend. The cover 16 is held to the resilient member 18 by means of four rivets 24 mounted through holes 26 in the cover 16 and holes 28 in the resilient member 18. It should be appreciated that the pad 14 could include only the resilient member 18 (i.e., without the cover 16).

Integral with the resilient member 18 are a plurality of mounts 30 or, more specifically, vibration-dampening mounts. The illustrated mounts 30 are formed as hollow spheres and, because of their resilient construction, may be compressed to absorb motorcycle vibration. The mounts 30 are aligned with apertures 32 in the platform 12. In the illustrated embodiment, four apertures in the platform 12 are provided for four mounts 30 of the resilient member 18. It should be appreciated that certain aspects of the present invention are applicable to any type of footboard assembly, including assemblies without vibration-dampening mounts.

Illustrated below the footboard assembly 10 is the decorative element 40 that may be mounted to the footboard assembly 10. The decorative element 40 consists of a trim piece 42 and a mounting plate in the form of a top plate 44 and a bottom plate 46. The top plate 44 is connected to the trim piece 42 and the bottom plate 46 by several fasteners 48 (e.g., rivets) that extend through the decorative element 40. The trim piece 42 is sandwiched and held between the top plate 44 and the bottom plate 46.

The illustrated trim piece 42 includes a flexible panel made from leather, in the preferred embodiment. The flexible panel is shaped to extend around the footboard assembly 10. The leather is cut into a plurality of flexible string elements or leather strips 50 that depend from or hang from the footboard assembly 10 when the decorative element 40 is mounted. Such a fringe or border gives a custom and traditional appearance to the motorcycle, and is aesthetically pleasing to many motorcycle owners.

The decorative element 40 is mounted to the footboard assembly 10 by means of several apertures 52 in the decorative element 40. Specifically, the apertures 52 are in the bottom plate 46 and are aligned with the mounts 30 of the footboard assembly 10. Using the apertures 52, the decorative elements may be fixed to the mounts 30 on the underside of the platform 12. In the illustrated embodiment, there are only three apertures 52 to mount to the outward three of the four mounts 30. The illustrated apertures 52 are circular, closed apertures. However, the apertures 52 may be a contiguous slot, or may be open apertures (i.e., open to the outer perimeter of the bottom plate 46).

FIG. 2 shows the footboard assembly 10 and decorative element 40 as mounted together on the motorcycle. As shown, the pad 14 is spaced from the platform 12 and the decorative element 40 hangs from the footboard assembly 10. The decorative element 40 runs along the outside perimeter 60 of the footboard assembly 10 on the outer side 62 away from the motorcycle 11. If the decorative element were along the inner side 64 of the footboard assembly 10, then it would be substantially obscured. Because the primary purpose of the decorative element 40 is aesthetic, decoration along the inner side 64 is omitted.

As indicated in FIG. 1, the decorative element 40 attaches to the footboard assembly 10 on the underside. FIG. 3 shows a cross-section through the footboard assembly 10 with the decorative element 40 mounted, and specifically through one of the shaker mounts 30 that interconnects the footboard assembly 10 and the decorative element 40. As shown, the mount 30 includes a circumferential groove 70 on the lower part of the mount 30. The circumferential groove is sufficiently elastic to accommodate both the platform 12 and the decorative element 40. A circumferential ledge 72 at the bottom of circumferential groove 70 holds the platform 12 and decorative element 40 to the mount 30. Thus, the decorative element 40 may be fixed to the footboard assembly 10 merely by pressing the decorative element 40 over the circumferential ledge 72 and into the circumferential groove 70 of the mount 30. The mounts 30 are designed such that a pliers may grip bosses 74 at the lower end of the mount to compress the mount and pull the platform 12 or decorative element 40 over the end. The decorative element 40 may thus be quickly and conveniently mounted to the footboard assembly 10 without disassembling the footboard assembly 10.

There are other ways to mount the decorative element 40 to the footboard assembly 10. The decorative element 40 could be mounted just above the platform 12 or just beneath the resilient member 18 at the top of the mount 30. Also, the mount 30 itself could be made to receive a specific decorative element, and include an aperture or groove. There are many possible configurations of vibration-absorbing mounts and cooperating decorative elements.

FIG. 4 shows the decorative element 40 in its assembled form. The thin leather sheet of the trim piece 42 is sandwiched between top plate 44 and bottom plate 46 to form a relatively compact mounting system to mount to the footboard assembly 10. The decorative element 40 may thus be sold as an aftermarket product that can be retrofitted to existing footboard assemblies 10.

While the several embodiments of the present invention have been shown and described, alternative embodiments will be apparent to those skilled in the art and are within the intended scope of the present invention. Therefore, the invention is to be limited only by the following claims.

I claim:

1. A footboard assembly with a decorative element, comprising:
    a footboard assembly including:
        a pad adapted for placement of a motorcycle operator's foot,
        a platform spaced from said pad and adapted to be mounted to a motorcycle, and
        at least one vibration-dampening mount that interconnects said pad to said platform; and
    a decorative element having at least one aperture that engages said mount.

2. The footboard assembly with a decorative element of claim 1, wherein said decorative element comprises a trim piece comprising a flexible panel.

3. The footboard assembly with a decorative element of claim 2, wherein said flexible panel comprises a plurality of flexible string elements that depend from said footboard assembly.

4. The footboard assembly with a decorative element of claim 1, wherein said pad is resilient.

5. The footboard assembly with a decorative element of claim 1, wherein said decorative element comprises a mounting plate.

6. The footboard assembly with a decorative element of claim 5, wherein said mounting plate comprises a substantially rigid metal plate.

7. The footboard assembly with a decorative element of claim 5, wherein said decorative element comprises a trim piece mounted to said mounting plate.

8. The footboard assembly with a decorative element of claim 7, wherein said mounting plate comprises a top plate and a bottom plate, and wherein a portion of said trim piece is sandwiched between said top plate and said bottom plate.

9. The footboard assembly with a decorative element of claim 5, wherein said aperture is in said mounting plate.

10. The footboard assembly with a decorative element of claim 1, wherein said apertures are closed apertures.

11. A footboard assembly with a decorative element, comprising:
    a footboard assembly adapted for placement of a motorcycle operator's foot and adapted to be mounted to a motorcycle; and
    a decorative element comprising
        a substantially rigid mounting plate engaged with said footboard assembly, and
        a trim piece mounted to said mounting plate.

12. The footboard assembly with a decorative element of claim 11, wherein said trim piece comprises a flexible panel.

13. The footboard assembly with a decorative element of claim 11, wherein said mounting plate comprises a top plate and a bottom plate, and wherein a portion of said trim piece is sandwiched between said top plate and said bottom plate.

14. The footboard assembly with a decorative element of claim 13, wherein said footboard assembly includes a platform adapted to be mounted to the motorcycle, and a pad connected to the platform and adapted for placement of a motorcycle operator's foot.

15. The footboard assembly with a decorative element of claim 14, wherein said pad is resilient.

16. The footboard assembly of claim 14, wherein said footboard assembly further includes a vibration-dampening mount interconnecting said pad to said platform.

17. A decorative element for mounting to a motorcycle footboard assembly having a plurality of shaker mounts, the decorative element comprising:
 a substantially rigid plate having a plurality of apertures dimensioned to engage the shaker mounts, and
 a trim piece connected to said rigid plate.

18. The decorative element of claim 17, wherein said apertures are closed apertures.

19. The decorative element of claim 17, wherein said rigid plate comprises a top plate and a bottom plate, and wherein said trim piece is sandwiched between said top plate and said bottom plate.

20. The decorative element of claim 17, wherein said trim piece includes a flexible panel having a plurality of flexible string elements that depend from said plate.

\* \* \* \* \*